(12) United States Patent
Staehlin

(10) Patent No.: US 11,273,829 B2
(45) Date of Patent: Mar. 15, 2022

(54) OFFBOARD TRAJECTORIES FOR DIFFICULT SITUATIONS

(71) Applicant: Continental Teves AG & Co. OHG, Frankfurt am Main (DE)

(72) Inventor: Ulrich Staehlin, Oakland Township, MI (US)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 243 days.

(21) Appl. No.: 16/482,853

(22) PCT Filed: Sep. 3, 2018

(86) PCT No.: PCT/DE2018/200080
§ 371 (c)(1),
(2) Date: Aug. 1, 2019

(87) PCT Pub. No.: WO2019/048009
PCT Pub. Date: Mar. 14, 2019

(65) Prior Publication Data
US 2020/0010083 A1 Jan. 9, 2020

(30) Foreign Application Priority Data
Sep. 7, 2017 (DE) ...................... 10 2017 215 749.6

(51) Int. Cl.
*B60W 30/00* (2006.01)
*B60W 30/16* (2020.01)
(Continued)

(52) U.S. Cl.
CPC ............ *B60W 30/16* (2013.01); *B60W 30/12* (2013.01); *B60W 50/0097* (2013.01);
(Continued)

(58) Field of Classification Search
CPC .. B60W 30/16; B60W 30/12; B60W 50/0097; B60W 50/0098; B60W 50/0225;
(Continued)

(56) References Cited

U.S. PATENT DOCUMENTS 8,258,980 B2 9/2012 Becker
8,880,272 B1 11/2014 Ferguson et al.
(Continued)

FOREIGN PATENT DOCUMENTS

DE 102006038018 2/2008
DE 102011083039 3/2013
(Continued)

OTHER PUBLICATIONS

EP English Translation for DE-2011-083039 (Year: 2011).*
(Continued)

*Primary Examiner* — Ian Jen
(74) *Attorney, Agent, or Firm* — W. F. Fasse

(57) ABSTRACT

A driver assistance system (10) for a vehicle includes a control unit (11), and a communication device (12) for receiving data from a server (30). The control unit (11) is configured to calculate a trajectory (T) for the vehicle on the basis of sensor data. The control unit (11) is also configured to replace the calculated trajectory (T) for the vehicle (20) with an offboard trajectory (T1) received from the server (30) under certain circumstances.

14 Claims, 2 Drawing Sheets

(51) Int. Cl.
*B60W 30/12* (2020.01)
*B60W 50/00* (2006.01)
*B60W 50/02* (2012.01)

(52) U.S. Cl.
CPC .... *B60W 50/0098* (2013.01); *B60W 50/0225* (2013.01); *B60W 2050/0082* (2013.01); *B60W 2050/0215* (2013.01)

(58) Field of Classification Search
CPC . B60W 2050/0082; B60W 2050/0215; B60W 2050/0078; B60W 2050/0079; B60W 50/00
See application file for complete search history.

(56) References Cited

U.S. PATENT DOCUMENTS

| | | | |
|---|---|---|---|
| 9,720,411 B2 | 8/2017 | Crombez et al. | |
| 2003/0055542 A1* | 3/2003 | Knockeart | G08G 1/096861 701/26 |
| 2018/0072315 A1 | 3/2018 | Enthaler et al. | |
| 2018/0370533 A1 | 12/2018 | Sofra et al. | |

FOREIGN PATENT DOCUMENTS

| | | |
|---|---|---|
| DE | 102014015014 | 3/2015 |
| DE | 102015203155 | 8/2015 |
| DE | 102015004550 | 10/2016 |
| DE | 102016007563 | 2/2017 |
| DE | 102015014651 | 5/2017 |

OTHER PUBLICATIONS

PCT, English translation of the International Search Report of the International Searching Authority for International Application PCT/DE2018/200080, dated Dec. 5, 2018, 2 pages, European Patent Office, HV Rijswijk, Netherlands.

PCT, PCT International Preliminary Report on Patentability including English Translation of PCT Written Opinion of the International Searching Authority for International Application PCT/DE2018/200080, dated Mar. 10, 2020, 9 pages, International Bureau of WIPO, Geneva, Switzerland.

German, German Search Report for German Patent Application No. 10 2017 215 749.6, dated Apr. 13, 2018, 10 pages, German Patent and Trademark Office, Muenchen, Germany, with partial English translation, 8 pages.

* cited by examiner

OFFBOARD TRAJECTORIES FOR DIFFICULT SITUATIONS

FIELD OF THE INVENTION

The invention relates to a driver assistance system for a vehicle, a vehicle having such a driver assistance system, a server for such a driver assistance system, a method for providing an offboard trajectory, a programming element as well as a computer-readable medium.

BACKGROUND INFORMATION

In automotive design, the focus is increasingly on digitization and partially or respectively fully autonomous driving. The aim with autonomous driving is, if at all possible, to avoid having recourse to the driver or respectively the user of the vehicle. In other words, the vehicle drives itself. Trajectories which the vehicle is to follow can be calculated for the vehicle for autonomous driving. However, situations can exist in which the vehicle's environment sensors cannot capture or respectively provide all of the relevant information for calculating trajectories, e.g. missing lane markings, difficult visibility conditions, a dirty roadway, or snow-covered road surroundings.

In normal situations, the trajectory for the vehicle is calculated based on an environment model from sensor data of environment sensors. If the sensor data of the environment sensors are no longer available or respectively are not available in a sufficient quality or respectively condition, a sufficiently reliable calculation of the trajectory cannot take place and the control of the vehicle has to be handed over to the driver or respectively to the user such that the latter controls the vehicle, or the vehicle is stopped. This can lead to an unsatisfactory user experience since the latter cannot fully exploit the partial or respectively fully autonomous driving.

SUMMARY OF THE INVENTION

In view of the above, it is an object of the invention to increase the safety of a vehicle and to improve the partially or fully autonomous driving.

The above object can be achieved by various aspects and embodiments of the invention as set forth herein.

A first aspect of the invention relates to a driver assistance system for a vehicle. The driver assistance system has a control unit, i.e. a driver assistance system controller, and a communication device for receiving data from a server. The control unit is designed to calculate a trajectory for the vehicle on the basis of sensor data and to control the vehicle in such a manner that it follows said trajectory as precisely as possible. The control unit is additionally designed to replace the trajectory for the vehicle under certain circumstances with an offboard trajectory received from the server, which is then used instead of the trajectory which it has calculated itself.

The control unit can be designed to calculate the trajectory for the vehicle on the basis of sensor data of environment sensors and, if necessary, further vehicle sensor data. The environment sensors can comprise, for example, radar, lidar, ultrasonic sensors, a laser scanner or a camera. Consequently, the sensor data can have image data, distance data or relative speeds. Thanks to said sensor data or respectively information of the environment sensors, the control unit can calculate the trajectory for the vehicle, in particular the position and the alignment of the vehicle in a lane with regard to the roadside, the oncoming carriageway, the lane marking or the guardrail. The calculated trajectory can serve to control the vehicle partially or, if necessary, also fully autonomously with the driver assistance system. In addition, the control unit can replace the calculated trajectory with an offboard trajectory from a server.

The control unit then typically replaces the calculated trajectory with the offboard trajectory at the latest if the sensor data are no longer available in a sufficient quality or respectively condition or if the environment sensors no longer supply any sensor data, such that a reliable calculation of the trajectory is not possible on the basis of the sensor data. Consequently, the partially or respectively autonomous control of the vehicle can be maintained even if this would no longer be reliably possible based on the sensor data.

In other words, it is a good idea to ask the server in good time prior to those situations in which the environment sensors can no longer supply all of the necessary sensor data, whether an offboard trajectory is provided or available for these areas. Said offboard trajectory can subsequently be sent or respectively transmitted by the server to the communication device of the driver assistance system of the vehicle. The control unit can use this offboard trajectory and control the vehicle according to said offboard trajectory, even without sensor data of the environment sensors. The environment model or respectively the environment sensors then supply information regarding "crash objects", for example a vehicle driving ahead, but no longer the sensor data or respectively the information for the trajectory or respectively the path planning of the vehicle.

The control unit of the driver assistance system can additionally be designed to always request offboard trajectories from the server so that the latter can, if required, replace the trajectory calculated by the control unit. Consequently, the probability of failure for the driver assistance system can be minimized, since a suitable offboard trajectory is always available and present. Consequently, unforeseeable problems or difficulties during the calculation of the trajectory can be handled, and the short-term failure of environment sensors can be compensated for.

The trajectory or respectively path curve describes a nominal track for the vehicle. This trajectory can contain particular waypoints at particular times with a particular vehicle alignment and position. The vehicle or respectively the propulsion systems of the vehicle endeavor, in turn, to follow the (specified) trajectory as well as possible, for example by adjusting the steering angle, by braking interventions or by accelerating the vehicle. The trajectory is typically executed in a lane-specific manner for the vehicle. In other words, the trajectory for the vehicle should be located centrally in a lane and should not leave said lane unless a lane change is desired.

According to an embodiment of the invention, the control unit is designed to recognize early on that no trajectory can be calculated on the basis of sensor data and to subsequently instruct the communication device to request and receive an offboard trajectory from the server and to replace the trajectory of the vehicle with the offboard trajectory received.

The control unit can deliberately instruct the communication device to request offboard trajectories from the server. To this end, the control unit can predict early on that no sufficiently accurate calculation of the trajectory will be possible in the near future on the basis of the sensor data of the vehicle, for example since, during a previous journey, problems with the calculation occurred at this location, because the weather report is predicting poor visibility conditions or because a construction site is located on the path. Due to the early requesting of the offboard trajectory, it can be ensured that the latter is available in good time such that the control unit can have recourse thereto in order to control the vehicle partially or respectively fully autonomously.

According to another embodiment of the invention, the offboard trajectory received from the server has information regarding the driving angle of the vehicle, the orientation of the vehicle, relative position data of the vehicle, absolute position data of the vehicle, the route to be driven, radii to be driven by the vehicle, speeds to be driven at or the time required for the route to be driven.

The information of the offboard trajectories can, for example, be produced by means of a reference journey. Alternatively or additionally, the vehicle having the driver assistance system can make its trajectories available to the server as an offboard trajectory.

According to an embodiment of the invention, the control unit is designed to instruct the communication device to request the offboard trajectory from the server if a value for the quality of the sensor data for calculating the trajectory falls below a predefined threshold.

It can be provided that offboard trajectories are requested by the communication device as soon as the quality or respectively the condition of the sensor data of the environment sensors falls below a certain threshold. The quality or respectively the condition of the sensor data can be expressed as a value which correlates with the quality of the sensor data. This value can subsequently be compared with the predefined threshold. The threshold can be selected such that it is always possible to act purely on the sensor data and there is still sufficient time to request the offboard trajectory from the server. In other words, an offboard trajectory can already be requested from the server (as a precaution) if the quality of the sensor data decreases.

According to an embodiment of the invention, the control unit is designed to instruct the communication device to request the offboard trajectory from the server if external influencing factors indicate a reduced quality of the sensor data.

It can be provided that offboard trajectories are requested by the control unit as soon as criteria are recognized, for example, by the environment sensors of the vehicle, which indicate that the quality or respectively the condition of the sensor data might not be sufficient to calculate a trajectory for a vehicle. Particular weather conditions can additionally trigger a request for an offboard trajectory by the control unit. Examples of the aforementioned criteria can be: snow at the roadside (lane markings may be covered), a low sun (difficult conditions for cameras if the vehicle is driving in the direction of the sun), construction sites (potential for making roads dirty), a rural region during harvesting time (increased potential for making roads dirty), hail, fog or (heavy) rain, e.g. if the weather report announces this, a corresponding time or respectively a corresponding date, when the windshield wiper is operating at its highest level or when the front fog lamp or respectively the rear fog lamp is active.

According to an embodiment of the invention, the driver assistance system additionally has a navigation device. The navigation device has map material, wherein the map material has an offboard trajectory. The control unit is designed to compare the offboard trajectory of the map material with the server's offboard trajectory.

Alternatively or additionally, the control unit can also obtain the offboard trajectory through the map material of a navigation device or respectively map unit (map and positioning unit). This can either take place through buffering in the vehicle, especially if the same location was only driven through recently or, in general, wherein the validity of the trajectories cannot always be ensured. Additionally, a comparison can take place with the server, in which it is checked whether the available offboard trajectory is still the currently valid offboard trajectory. This can happen, for example, by using a clear ID for each offboard trajectory. As a result, it can be ensured that the currently valid offboard trajectory is always used, but data are only transmitted between the driver assistance system and the server if a new offboard trajectory is required for the driver assistance system, that is to say if the ID of the offboard trajectory of the navigation device does not coincide with the ID of the server's offboard trajectory.

Alternatively or additionally, the infrastructure data can already be provided in the map material of the driver assistance system as digital maps. The term "digital maps" or "digital map data" also denotes maps for advanced driver assistance systems (ADAS), without navigation taking place.

A further aspect of the invention relates to a server for a driver assistance system which is described above and below.

It should be noted that the server can also be designated a backend. Multiple servers can additionally be combined into one server. Rather, the term "server" within the framework of this application describes a unit which is external to the vehicle, which can provide or send data, in particular an offboard trajectory, to the driver assistance system which is described above and below.

According to another embodiment of the invention, the communication or respectively the data exchange with the server is effected wirelessly, preferably via WLAN, Bluetooth and/or mobile radio such as, for example, UMTS, 3G, LTE, 4G or 5G.

The wireless transfer or respectively the wireless reception of the offboard trajectory can be effected by Bluetooth, WLAN (e.g. WLAN 802.11a/b/g/n/ac or WLAN 802.11p), ZigBee or WiMax or cellular radio systems such as GPRS, UMTS, 3G, 4G, 5G or LTE. It is also possible to use other transfer protocols. The indicated protocols offer the advantage of the already achieved standardization.

It should be noted that a bidirectional data exchange between the communication device of the driver assistance system and the server is also possible. As a result, the driver assistance system can send the vehicle's sensor data which have been captured to the server. In particular, the server can thus obtain data from the driver assistance system in "good" visibility conditions and send these collected data back to the driver assistance system in "poor" visibility conditions. It should be noted that the server can also send or respectively provide data, in particular offboard trajectories, to multiple different driver assistance systems.

According to an embodiment of the invention, the server is designed to recognize early on that a reliable calculation of the trajectory by the control unit of the driver assistance system will probably not be possible on the basis of sensor data, and to subsequently send the offboard trajectory to the communication device of the driver assistance system.

Critical geographical areas, in which offboard trajectories are typically to be provided, can be saved on the server. The areas in which the environment sensors of the vehicles have problems can be identified by the number of requests for offboard trajectories by the control unit of the driver assistance system. For example, it can be that a particular road constellation repeatedly leads to problems in many different driver assistance systems, such that these repeatedly request an offboard trajectory for this area from the server. As a result, the server can identify this area (cumulative offboard trajectories requests) as a critical area. The server can send the offboard trajectories to the communication apparatuses of the driver assistance system pre-emptively or respectively as a precaution in the identified critical area. Consequently, the suitable offboard trajectory is available to the control unit of the driver assistance system, without the communication device of the driver assistance system having to request this itself. In other words, the server can be designed to trigger the dispatch of the offset trajectories to the driver assistance system, if said server considers a future request for an offboard trajectory by the communication device of the driver assistance system to be likely.

A further aspect of the invention relates to a vehicle having an angle determining device which is described above and below.

The vehicle is, for example, a motor vehicle such as a car, bus or truck, or a ship or an aircraft such as a helicopter or airplane.

A further aspect of the invention relates to a method for providing an offboard trajectory for a driver assistance system.

The method has the steps of:
 calculating a trajectory by a control unit on the basis of sensor data;
 receiving an offboard trajectory from a server by a communication device;
 replacing the trajectory with the offboard trajectory received from the server.

The individual steps of the method can be executed in parallel or sequentially. Additionally, the sequence of the individual steps can be amended. There can also be a longer time interval between the individual steps.

A further aspect of the invention relates to a programming element which, if it is run on a control unit of a driver assistance system, instructs the driver assistance system to carry out the method which is described above and below.

A further aspect of this invention relates to a computer-readable medium, on which a programming element is stored, which instructs the control unit of a driver assistance system to carry out the method which is described above and below.

Further features, advantages and possible applications of the invention are set out in the following description of the exemplary embodiments and the figures.

BRIEF DESCRIPTION OF THE DRAWINGS

The figures are schematic and not true to scale. If the same reference numerals are cited in the following description of the figures, these denote the same or similar elements.

DETAILED DESCRIPTION OF EXAMPLE EMBODIMENTS OF THE INVENTION

Figure 1:
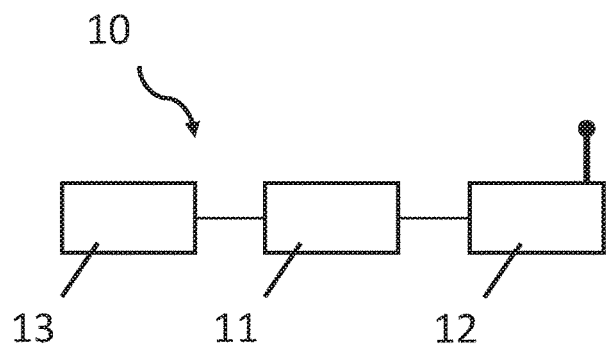
FIG. 1 shows a block diagram of a driver assistance system according to an embodiment of the invention.

FIG. 1 shows a block wiring diagram of a driver assistance system 10. The driver assistance system 10 has a control unit 11, a communication device 12 and a navigation device or respectively map device 13. The control unit 11 is designed to calculate or respectively to determine a trajectory for a vehicle on the basis of sensor data. The communication device 12 is designed to receive data, in particular an offboard trajectory, from a server and to send said data. The control unit 11 is additionally designed to replace the calculated trajectory with the offboard trajectory received from the server. A vehicle can be controlled partially or respectively fully autonomously on the basis of the trajectory or respectively the received offboard trajectory.

The control unit 11 can be designed to recognize early on that there is a likelihood that a trajectory will not be able to be reliably calculated on the basis of the sensor data, for example because during an earlier journey it was not possible to calculate the trajectory, or the weather conditions are worse. If this has been established, the control unit 11 can instruct the communication device 12 to request an offboard trajectory from the server. The offboard trajectory sent by the server can subsequently be used by the control unit 11 of the driver assistance system 10 or respectively said offboard trajectory can replace the calculated trajectory. Consequently, the vehicle can furthermore drive partially or respectively fully autonomously, even if this would not be possible on the basis of the sensor data of the environment sensors. The server's offboard trajectory can comprise information regarding the driving angle, the orientation, radii to be driven, speeds to be driven at, relative position data, absolute position data, the route to be driven and the time required by the vehicle for this.

According to another embodiment of the invention, the control unit 11 of the driver assistance system 10 can be designed to judge the quality of the sensor data of the vehicle's environment sensors. To this end, a value which correlates with the quality of the data can be compared with a predefined threshold. If the value for the quality of the sensor data falls below the predefined threshold, the control unit 11 can instruct the communication device 12 to request an offboard trajectory from the server. In other words, the control unit 11 can trigger or respectively prompt a request for an offboard trajectory on the basis of the quality of the sensor data.

Alternatively or additionally, the control unit 11 can instruct the communication device 12 to request the offboard trajectory from the server if external influencing factors such as, for example, weather conditions such as snow, rain, fog or hail indicate a reduced quality of the sensor data. In other words, the control unit 11 triggers a request for offboard trajectories if bad environmental conditions which may have a negative effect on the sensor data are to be expected.

The navigation device or respectively map device 13 of the driver assistance system 10 can have digital maps for the vehicle's navigation or respectively driver assistance systems. Likewise, an offboard trajectory can be stored in these digital maps. Said offboard trajectory can be used by the control unit 11 in order to replace the calculated trajectory of the control unit 11. It can additionally be provided that the offboard trajectory stored in the digital map is compared with the offboard trajectory on the server such that the currently valid offboard trajectory is always used by the control unit 11 of the driver assistance system. To this end, each offboard trajectory can have a clear ID, for example. The ID of the offboard trajectory on the server can subsequently be compared with the ID of the offboard trajectory from the digital maps. If the two IDs differ from one another, the offboard trajectory can be requested from the server and received by the communication device 12. If, however, the IDs coincide, the offboard trajectory from the digital maps can be used such that the data transfer between the server and the communication device 12 is reduced to a minimum.

Figure 2:
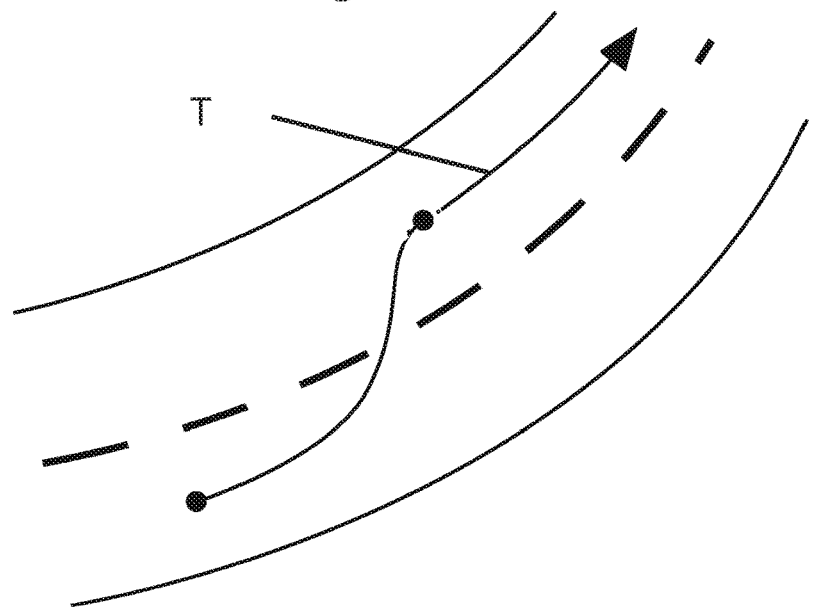
FIG. 2 shows a schematic representation of a calculated trajectory of the control device of the driver assistance system according to an embodiment of the invention.

FIG. 2 shows a schematic representation of a trajectory T which has been calculated by a control unit of a driver assistance system. This trajectory T is represented by a solid line with an arrow which symbolizes the direction of travel in FIG. 2. The calculated trajectory T is typically located in the center of a lane. In FIG. 2, two lanes which are separated by the median strip (dashed line) are represented. A lane change of the vehicle is additionally represented in FIG. 2.

Figure 3:
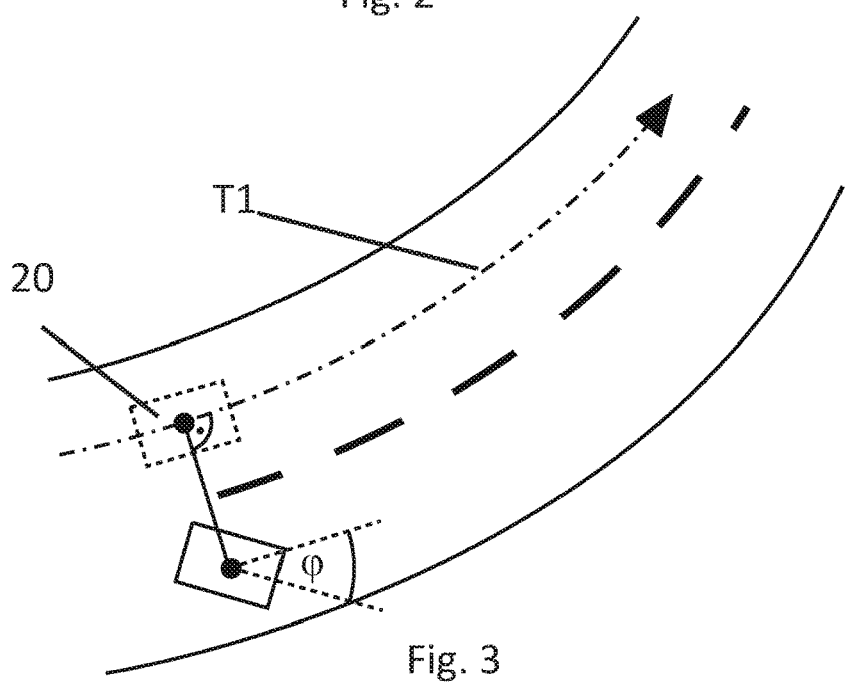
FIG. 3 shows a schematic representation of an offboard trajectory of the server, which is received by the communication device according to an embodiment of the invention.

FIG. 3 shows a schematic representation of an offboard trajectory T1 received by the communication apparatus. The offboard trajectory T1 is represented as a dashed line and the arrow symbolizes the direction of travel of the vehicle. The vehicle 20 is represented as a dashed rectangle which is moving along said offboard trajectory T1. A road on which the server's offboard trajectory T1 is located centrally is additionally represented in FIG. 3. The server's offboard trajectory T1 can contain, among other things, driving angle information φ. The offboard trajectory T1 can additionally contain information regarding routes, waypoints, relative or absolute positions, speeds to be driven at, radii or times. A vehicle is additionally represented in FIG. 3 with the solid rectangle, which symbolizes an erroneous positioning by the sensor data of the vehicle's environment sensors. This erroneous positioning of the vehicle necessitates the request for an offboard trajectory T1 so that the vehicle 20 can drive partially or respectively fully autonomously.

Figure 4:
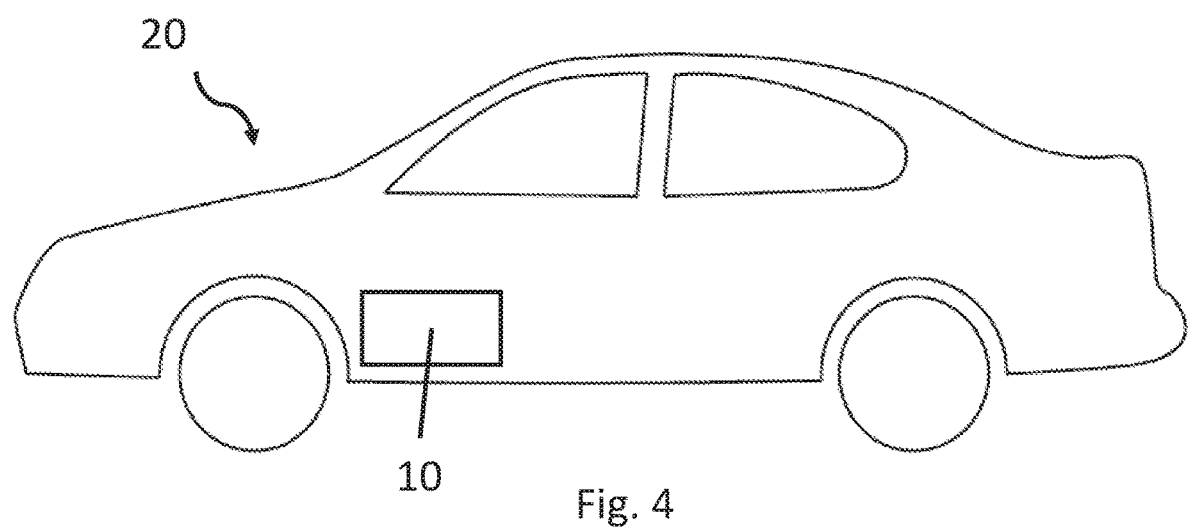
FIG. 4 shows a vehicle having the driver assistance system according to an embodiment of the invention.

FIG. 4 shows a schematic representation of a vehicle 20 having a driver assistance system 10 which is described above and below. The driver assistance system 10 can access sensor data of the environment sensors of the vehicle 20. The driver assistance system 10 can additionally be designed to control the vehicle 20 partially or respectively fully autonomously. In other words, the vehicle 20 having the driver assistance system 10 can drive without the driver or respectively the user doing anything.

Figure 5:
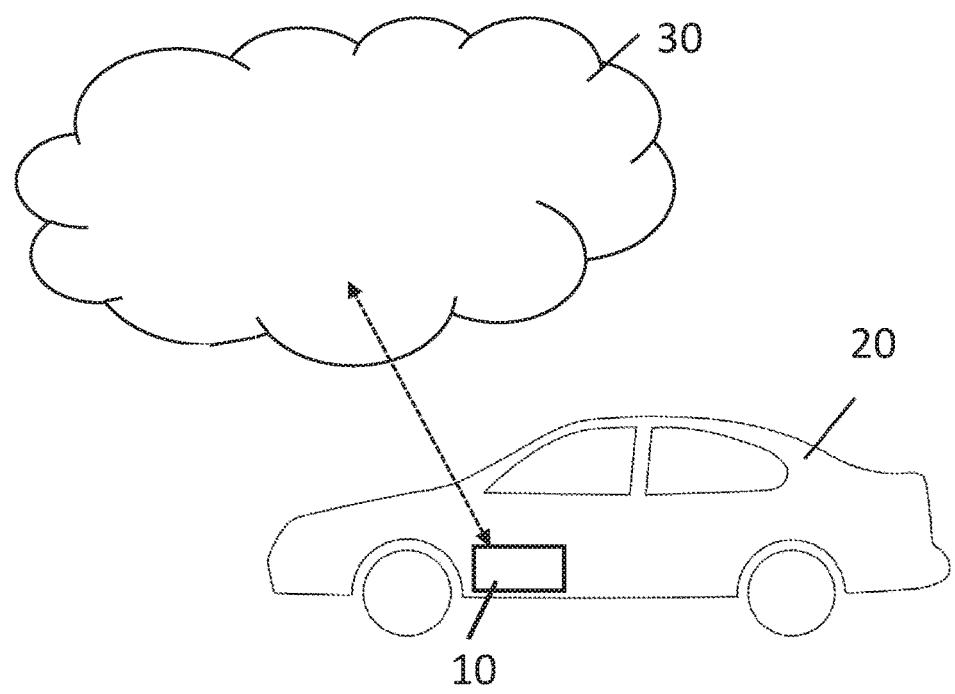
FIG. 5 shows a schematic representation of a vehicle having the driver assistance system as well as a server for the driver assistance system according to an embodiment of the invention.

FIG. 5 shows a schematic representation of a vehicle 20 having a driver assistance system 10 and an offboard server 30 (backend). The offboard server 30 is represented as a cloud in FIG. 5, and the data exchange between the driver assistance system 10 and the offboard server 30 is illustrated as a dashed line between these two. The communication device of the driver assistance system 10 can request an offboard trajectory from the offboard server 30. The offboard server 30 subsequently sends said requested offboard trajectory to the communication device of the driver assistance system 10. The control unit of the driver assistance system can control the vehicle 20 partially or respectively fully autonomously with the offboard trajectory received, even if this would not be possible on the basis of the sensor data of the environment sensors. According to an embodiment of the invention, the data exchange, in particular of trajectories, can be effected bidirectionally. In other words, the driver assistance system 10 can send the calculated trajectories to the offboard server 30. The offboard server 30, in turn, can send or respectively make available these calculated trajectories of the driver assistance system 10 to other road users as offboard trajectories.

Figure 6:
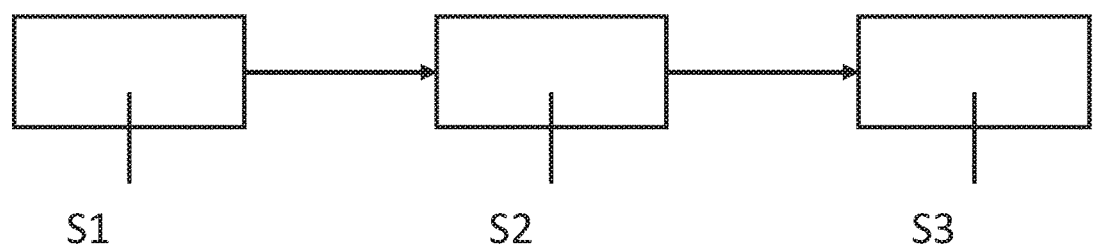
FIG. 6 shows a flow chart for a method for providing offboard trajectories according to an embodiment of the invention.

FIG. 6 shows a flow chart of a method for providing an offboard trajectory for a driver assistance system. In a first step S1, a control unit of a driver assistance system can calculate a trajectory for a vehicle on the basis of sensor data. In a step S2, a communication device of the driver assistance system can receive an offboard trajectory from a server. In a final step S3, the control unit of the driver assistance system can replace the trajectory with an offboard trajectory received by the communication device.

The invention claimed is:

1. A driver assistance system for a vehicle, comprising:
   vehicle environment sensors configured to be mounted on the vehicle to detect an environment in which the vehicle operates, and to produce onboard environment sensor data regarding the environment detected by the vehicle environment sensors;
   a driver assistance system controller configured to receive the onboard environment sensor data regarding the environment from the vehicle environment sensors; and
   a wireless communication device configured to wirelessly receive data including an offboard trajectory from an offboard server remote from the vehicle;
   wherein the driver assistance system controller is configured to calculate an onboard trajectory for the vehicle based on the onboard environment sensor data, and
   wherein the driver assistance system controller is configured to control a driving operation of the vehicle, based on the onboard trajectory during a first time period, and based on the offboard trajectory during a second time period, dependent on and in response to an availability and/or a quality of the onboard environment sensor data.

2. The driver assistance system according to claim 1, wherein the driver assistance system controller is configured to recognize, during the first time period, that the onboard trajectory will no longer be calculable with sufficient reliability based on the onboard environment sensor data, and consequently to instruct the wireless communication device to request and receive the offboard trajectory from the offboard server and to begin the controlling of the driving operation of the vehicle based on the offboard trajectory during the second time period.

3. The driver assistance system according to claim 1, wherein the offboard trajectory includes information regarding a driving angle of the vehicle, an orientation of the vehicle, relative position data of the vehicle, absolute position data of the vehicle, a route to be driven by the vehicle, radii to be driven by the vehicle, speeds to be driven by the vehicle, or a time required for the route to be driven by the vehicle.

4. The driver assistance system according to claim 1, wherein the driver assistance system controller is configured to instruct the wireless communication device to request the offboard trajectory from the offboard server when a value for a quality of the onboard environment sensor data for calculating the onboard trajectory falls below a predefined threshold.

5. The driver assistance system according to claim 1, wherein the driver assistance system controller is configured to instruct the wireless communication device to request the offboard trajectory from the offboard server when external influencing factors indicate a reduced quality of the onboard environment sensor data.

6. The driver assistance system according to claim 1, further comprising a navigation device or a map device,
wherein the navigation device or the map device includes map material,
wherein the map material comprises a map-based trajectory, and
wherein the driver assistance system controller is configured to compare the map-based trajectory with the offboard trajectory.

7. A vehicle comprising a vehicle body and a driver assistance system according to claim 1.

8. A server for a driver assistance system according to claim 1.

9. The server according to claim 8,
wherein the server is configured to recognize, during the first time period, that the onboard trajectory will no longer be calculable by the driver assistance system controller based on the onboard environment sensor data, and consequently to transmit the offboard trajectory to the wireless communication device of the driver assistance system.

10. A method of operating a driver assistance system of a vehicle, comprising the steps:
with environment sensors mounted on the vehicle, detecting an environment in which the vehicle operates, and producing onboard environment sensor data regarding the environment;
with a driver assistance system controller of the driver assistance system, calculating an onboard trajectory based on the onboard environment sensor data;
with a wireless communication device of the driver assistance system, wirelessly receiving an offboard trajectory from an offboard server remote from the vehicle; and
with the driver assistance system controller, controlling a driving operation of the vehicle, based on the onboard trajectory during a first time period, and based on the offboard trajectory during a second time period, dependent on and in response to an availability and/or a quality of the onboard environment sensor data.

11. A programming element which, when executed on a driver assistance system controller of a driver assistance system, instructs the driver assistance system to operate according to the method according to claim 10.

12. A computer-readable medium, on which the programming element according to claim 11 is stored.

13. The method according to claim 10,
wherein the driving operation of the vehicle is controlled based on the onboard trajectory when the availability of the onboard environment sensor data is affirmative and the quality of the onboard environment sensor data meets or exceeds a predefined quality threshold, and
wherein the driving operation of the vehicle is controlled based on the offboard trajectory when the availability of the onboard environment sensor data is not affirmative, and when the quality of the onboard environment sensor data falls below the predefined quality threshold.

14. The driver assistance system according to claim 1,
wherein the driver assistance system controller is configured to control the driving operation of the vehicle based on the onboard trajectory when the availability of the onboard environment sensor data is affirmative and the quality of the onboard environment sensor data meets or exceeds a predefined quality threshold, and
wherein the driver assistance system controller is configured to control the driving operation of the vehicle based on the offboard trajectory when the availability of the onboard environment sensor data is not affirmative, and when the quality of the onboard environment sensor data falls below the predefined quality threshold.

* * * * *